United States Patent [19]

Weinhold

[11] 4,252,347
[45] Feb. 24, 1981

[54] DEVICE FOR CONNECTING PIPE ENDS

[76] Inventor: Karl Weinhold, Im Jagdfeld 43, 4040 Neuss, Fed. Rep. of Germany

[21] Appl. No.: 935,978

[22] Filed: Aug. 22, 1978

[30] Foreign Application Priority Data

Sep. 7, 1977 [DE] Fed. Rep. of Germany ....... 2740206
Jan. 31, 1978 [DE] Fed. Rep. of Germany ....... 2804017

[51] Int. Cl.³ ............................................. F16L 35/00
[52] U.S. Cl. ........................................ 285/38; 285/93; 285/175; 285/261; 285/263; 285/347
[58] Field of Search ............... 285/184, 261, 263, 266, 285/166, 167, 38, 93, 175, 347

[56] References Cited

U.S. PATENT DOCUMENTS

| | | | |
|---|---|---|---|
| 3,649,052 | 3/1972 | Snyder | 285/38 |
| 3,695,644 | 10/1972 | Goldberg | 285/166 X |
| 3,844,589 | 10/1974 | Bram | 285/184 |
| 3,891,246 | 6/1975 | Hopper | 285/184 X |
| 4,077,657 | 3/1978 | Trzeciak | 285/184 |

FOREIGN PATENT DOCUMENTS

| | | | |
|---|---|---|---|
| 821890 | 11/1951 | Fed. Rep. of Germany | 285/263 |
| 1170250 | 9/1958 | France | 285/61 |
| 1185193 | 2/1959 | France | 285/184 |
| 465518 | 6/1975 | U.S.S.R. | 285/184 |

Primary Examiner—Dave W. Arola
Attorney, Agent, or Firm—Spencer & Kaye

[57] ABSTRACT

A device for connecting pipe ends comprising a bearing ring for attachment sealingly to one pipe end, the ring having a spherical outer surface and an annular end surface lying in a plane inclined to a plane extending at right angles to the ring axis, a coupling part surrounding the bearing ring, axially displaceable relative thereto and having an inner spherical surface matching to the outer spherical surface of the bearing ring, the coupling part having a stop ring extending inwardly behind the bearing ring, a seal between the two spherical surfaces, an annular inclined stop surface associated with the coupling part and complementary to and in engagement with the annular end surface of the bearing ring and a connecting part connectable with the coupling part for attachment to the other pipe end.

11 Claims, 5 Drawing Figures

DEVICE FOR CONNECTING PIPE ENDS

BACKGROUND OF THE INVENTION

The invention relates to a device for connecting two pipe ends, having a bearing ring on one pipe end which is in the shape of a spherical segment, having a coupling part surrounding the bearing ring, which is axially displaceable with respect to the bearing ring and the pipe end and has a bearing surface matched to the shape of the bearing ring on its inside, having a seal between this bearing surface and the bearing ring, having a stop ring projecting inwards, which engages behind the bearing ring, and having a connecting part connected to the other pipe end said connecting part being capable of connection to the coupling part.

Two pipe ends can be connected together pivotally over a certain angle range with respect to each other with the aid of such a device. This is made possible by the bearing ring in the shape of a spherical segment and by the bearing surface matched to its shape on the inside of the coupling part. The connecting part is constructed as a plug part which can be inserted into the coupling part and is also provided with an outer collar as is the coupling part so that shell parts which can be closed by a lever lock and are provided for the purpose of connecting these two parts to flanges directed radially inwards can be used.

The two pipe ends are not locked in their pivot position with respect to each other during operation. With a relatively high operating pressure however it is conceivable that loading could become effective between the pipe ends, said loading attempting to pivot the pivoted pipe end back into a position coaxial to the other pipe end. This disadvantageous effect increases as the cross-section of the pipe increases and therefore it is particularly unfavourable when connecting pipe ends under high pressure and having a fairly large cross-section if the pipe ends cannot be locked at a certain pivot angle with respect to each other.

SUMMARY OF THE INVENTION

It is an object of the invention, to improve a device of the type mentioned at the outset so that pressure loading, arising within the pipe ends, cannot lead to a change in the angle position between the pipe ends once this angle has been set.

According to the invention, there is provided a device for connecting two pipe ends comprising a bearing ring for attachment sealingly to one pipe end and defining a spherical outer surface and an annular end surface lying in a plane inclined to a plane extending at right angles to the ring axis, a coupling part surrounding the bearing ring, axially displaceable relative thereto and defining an inner spherical surface matched to said outer spherical surface of said bearing ring, a stop ring on said coupling part extending inwardly behind said bearing ring, a seal between said outer spherical surface of said bearing ring and said inner spherical surface of said coupling part, an annular inclined stop surface associated with said coupling part and complementary to and in engagement with said annular end surface of said bearing ring, and a connecting part for attachment to the other pipe end connectable with said coupling part.

BRIEF DESCRIPTION OF THE DRAWINGS

The invention will now be described in greater detail by way of example with reference to the drawings in which.

DESCRIPTION OF THE PREFERRED EMBODIMENTS

Figure 1:
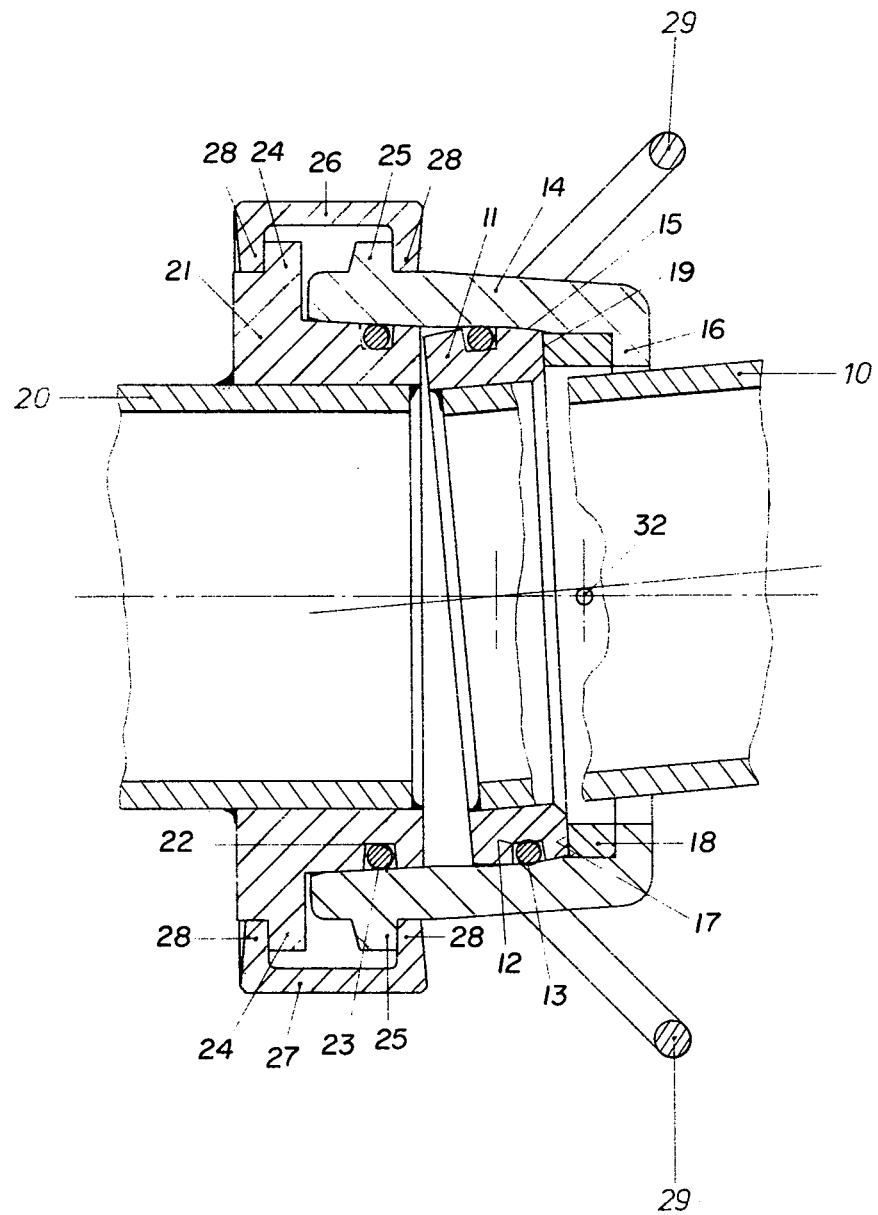
FIG. 1 shows a longitudinal section through the device of a first embodiment of the invention including two pipe ends in a position pivoted with respect to each other.

The invention proposes, in a device as mentioned at the outset that, on its side facing the stop ring, the bearing ring should have an annular surface lying in a plane inclined at an angle to a plane at right angles to the axis of the bearing ring and that a similarly inclined stop surface is formed in the coupling part, the annular surface of the bearing ring resting on this stop surface.

While the pipe end, surrounded by the coupling part, only came to rest against the stop ring of the inwardly projecting coupling part with its bearing ring in a relatively small peripheral region, in the known device with the pipe ends in a position with respect to each other such that they are pivoted out of the coaxial position, full abutment of the annular surface of the bearing ring against the stop surface in the coupling part is ensured independently of the respective pivot position in the proposed device. Therefore the operating pressure prevailing in the pipe ends can no longer force back the pipe end pivoted inside the coupling part into the position which is coaxial to the other pipe end. The desired angular position necessary can be provided simply by means of relative rotation between the coupling part and the pipe end. An angle range of 360° is available for this relative rotation. The inclinations of the annular surface and the stop surface with respect to the plane at right angles to the ring axis are added together in one extreme position; this corresponds to the largest possible pivot angle. In the other extreme position, which differs by 180°, the two inclinations are subtracted so that the pipe ends are now coaxial with respect to each other.

The stop surface on which the annular surface of the bearing ring comes to rest can be an integral part of the stop ring of the coupling part projecting inwards, i.e. the stop ring is formed accordingly. However, it is also conceivable that the stop surface is an integral part of a wedge ring which is inserted into the coupling part between the stop ring and the bearing ring. The use of this type of wedge ring facilitates manufacture since the working of an appropriate, inclined surface inside the coupling part will usually require greater technical expenditure.

The wedge ring can be locked advantageously with respect to the coupling part so as to be fixed and unable to rotate. This can be achieved for example by means of caulking, pinning etc.

It is conceivable however that the contact pressure produced by the operating pressure, the said contact pressure contributing to preventing twisting of the bearing ring and the stop surface in the coupling part, falls below a certain value or takes on the value zero for example when cutting off the operating pressure. In this case, a change in the pivot position between the pipe ends is not always ruled out even without twisting between the bearing ring and the stop surface in the coupling part. A change in the pivot position is possible in fact if the pipeline elements connected together are not fixed in their position relative to each other i.e. if there are no fastenings, mounting brackets etc. present which keep the pipeline elements in a predetermined position. In this case the pipeline elements can be brought into the coaxial position by means of outer action of force from a pivoted position. Thus the bearing ring located in the coupling part and in that peripheral region which has the smallest axial expanse can be displaced towards the connecting element and thus can leave the inner bearing surface in the coupling part which is in the shape of a circle segment.

In order that the sealing action is not reduced very heavily or completely eliminated in this case, such that the medium contained in the pipe can flow out, it is furthermore proposed that a support surface in the shape of a spherical segment should be constructed on the side of the bearing ring facing the connecting part; that the connecting part should have a complementary surface in the shape of a spherical segment and cooperating therewith; and that the spherical radius of the support surface and the complementary surface should be smaller than a radius corresponding to the spacing between a bearing point of the outer bearing ring surface on the bearing surface of the coupling part and the point diametrially opposite this bearing point on the outer end edge of the support surface.

With the aid of the support surface and the complementary surface, a support acting axially for any pivot position possible is present between the bearing ring and the connecting element. Also if the pipeline elements connected together by the device are not fixed in their position by fastenings, mounting brackets etc. it is now ensured that there is no possibility of pivoting inside the coupling part about a point lying on its peripheral surface during low or cut off operating pressure on the bearing ring, whereby the region of the bearing ring diametrally opposite this point is displaced towards the connecting part. Such a displacement is now no longer possible because of the additional support if the sphere radius of the support surface on the bearing ring and its corresponding surface in the connecting part is dimensioned as suggested. Thus the pipeline elements connected by the device cannot be pivoted with respect to each other either in the stated preconditions without relative rotation between the bearing ring and the stop surface of the coupling part and are reliably sealed even in the pressureless condition.

Furthermore, it is proposed that the sphere radius of the support surface and of the complementary surface should be approximately equal to the inner radius of the bearing ring. As a result, the support surface and the complementary surface are placed as far as possible near the clear cross-section of the pipe and this is advantageous for reasons of functioning and manufacture.

In accordance with a further proposal, it is advantageous if an internal ring is inserted into the bearing ring, this internal ring projecting on the side of the bearing ring facing the connecting element and the projecting part of said internal ring having the support surface.

Figure 2:
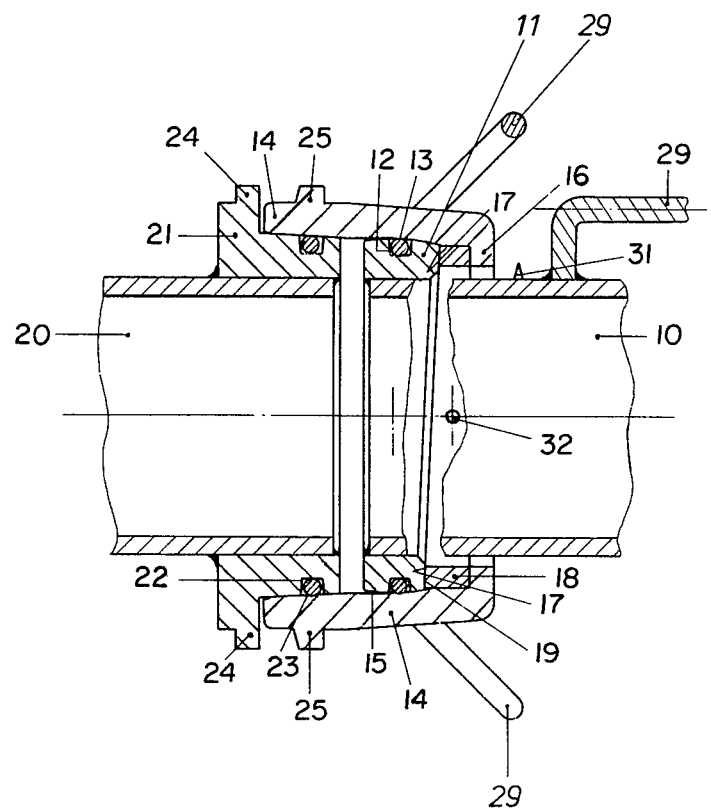
FIG. 2 shows the pipe ends in a position coaxial with respect to each other in a view corresponding to that of FIG. 1.
Figure 3:
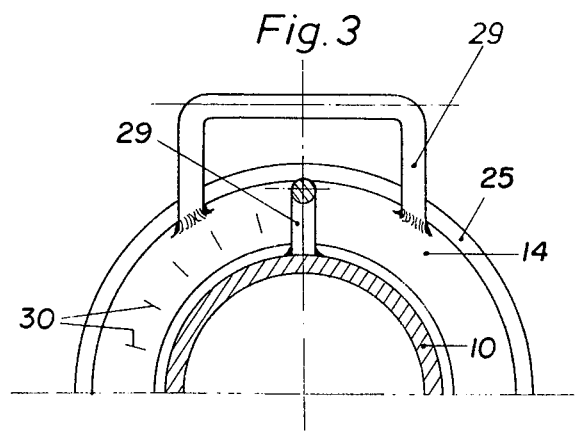
FIG. 3 shows a view of the device according to FIGS. 1 and 2 taken in an axial direction.

Referring now to FIGS. 1 to 3 of the drawings, a pipe end 10 is provided with a bearing ring 11, which is in the shape of a spherical segment at its outer periphery and has an annular groove 12 into which an annular seal 13 is inset.

The bearing ring 11 is surrounded by a coupling part 14 which has a bearing surface 15 matched to the shape of the bearing ring 11 on its inside and is provided at one end with an inwardly projecting stop ring 16. The clear inner diameter of the said stop ring 16 is dimensioned so that sufficient space is present for pivoting the pipe end 10 inside the coupling part 14, while the bearing ring 11 is engageable to the rear in an axial direction in all circumstances.

The bearing ring 11 has an annular surface 17 inclined with respect a plane at right angles to the axis of the pipe end 10 at its end facing the stop ring 16. A wedge ring 18 is inserted between the bearing ring 11 and the stop ring 16, the side of the wedge ring 18 facing the bearing ring 11 being constructed also as an inclined stop surface 19. The wedge ring 18 is retained inside the coupling part 14 against twisting and axial displacement with the aid of pins 32, only one of which is shown here. The stop surface 19 and the annular surface 17 can be roughened if necessary in order to reduce the rotatability existing between the pipe end 10 and the coupling part 14 during operation by increasing the friction.

The other pipe end 20 is provided with a connecting part 21 which is constructed as a plug part fitting into the coupling part 14. A further annular seal 23, also inset into an annular groove 22, serves to provide a seal between these parts.

The connecting part 21 is provided with an outer collar 24. A further collar 25 is located at the outer periphery of the coupling part 14. Shell parts 26 and 27 which are connected together in articulated manner at one end and can be closed at their outer ends with the aid of a lever lock (not shown) serve to hold together the coupling part 14 and the connecting part 21. The shell parts 26 have radially inwardly projecting flanges 28 which engage behind the collars 24 and 25.

On the outside of the coupling part 14 are welded two bracket shaped handles 29 lying opposite each other. A further handle 29 is set on the pipe end 10. Furthermore the coupling part 14 is provided with scale marks 30. The handle 29 fixed to the pipe end 10 has such a position in the rotary position shown in FIGS. 2 and 3, in which the pipe ends 10 and 20 lie coaxially with respect to each other, that it is approximately at the center of the handle 29 which runs crosswise and is fixed to the coupling part 14. The handle 29 fixed on to the pipe end 10 can therefore serve quite well as a marking which cooperates with the scale marks 30. If necessary a marking 31 can be provided additionally however as can be seen in FIG. 2.

Moreover, it may be seen from FIG. 2 that the inclination of the annular surface 17 of the bearing ring 11 with respect to a plane at right angles to the axis of the bearing ring and the inclination of the stop surface 19 of the wedge ring 18 with respect to a plane at right angles to the axis of the wedge ring will balance out. Thus a coaxial position of the two pipe ends 10 and 20 is provided.

In contrast, in FIG. 1 the largest achievable pivot position is shown in which the inclinations of the annular surface 17 and the stop surface 19 add together to the full extent.

Moreover, it is advantageous that, after releasing the shell parts 26 and 27 of the coupling part 14 it is possible to push them so far on to the pipe end 10 that the actual plug part of the connecting part 21 is completely free. When exchanging individual pipeline elements within a line system, it is not necessary to push the pipeline elements apart axially.

Figure 4:
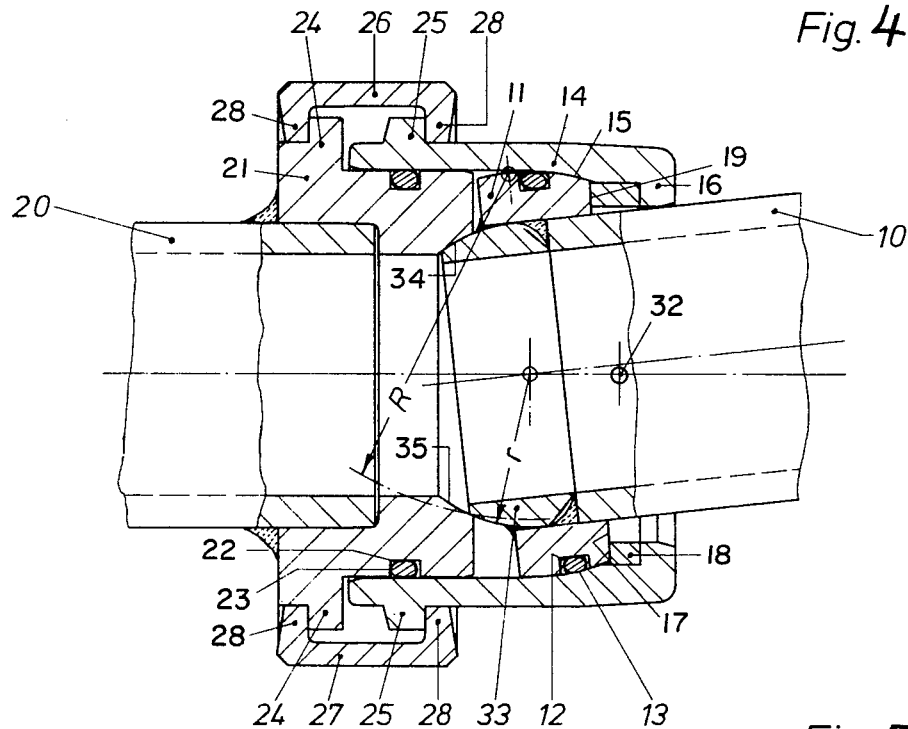
FIG. 4 shows a view corresponding to FIG. 1 of a modified embodiment of the device.
Figure 5:
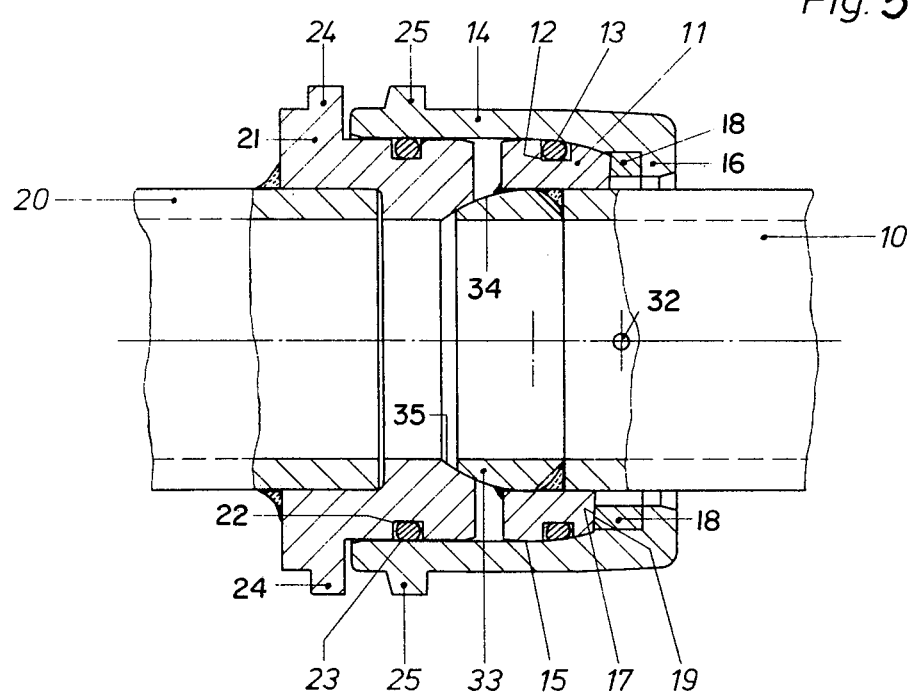
FIG. 5 shows a view corresponding to FIG. 4 with the pipe ends in a position coaxial to each other.

In a second embodiment of the invention as shown in FIGS. 4 and 5, where the individual parts of the device of the embodiment shown in FIGS. 1 to 3 correspond thereto, the same reference numbers have been used. Thus it is only necessary to explain in greater detail below the differences with respect to the first embodiment.

The pipe end 10 does not now penetrate quite so far into the bearing ring 11. An internal ring 33 is inserted from the end facing the connecting part 21 and is fixed by welding in such a position that it projects to some extent out of the bearing ring 11. The projecting part forms an outer support surface 34 which is in the shape of a spherical segment, said support surface running annularly along the periphery and its radius r corresponding to the inner diameter of the bearing ring 11. The internal ring 33 projects approximately up to half of the axial length of the bearing ring 11 into it and abuts the end surface of the pipe end 10 which is inserted into the bearing ring 11 from the other side.

The connecting part 21 has a corresponding surface 35 on its side facing the bearing ring 11 said corresponding surface 35 having the same radius r, the support surface 34 abutting the corresponding surface 35.

The device thus has the following mode of operation:

The inclination of the annular surface 17 of the bearing ring 11 with respect to an exactly radial plane, i.e. a plane at right angles to the axis of the bearing ring, and the inclination of the stop surface 19 of the wedge ring 18 with respect to a plane at right angles to the axis of the wedge ring are selected to balance each other, as can be seen from the coaxial position of the two pipe ends 10 and 20 shown in FIG. 5. In contrast to this, FIG. 4 shows the largest achievable pivot position in which the inclinations of the ring surface 17 and the stop surface 19 add together. The desired pivot angle can be predetermined between these two positions by means of appropriate relative rotation between the bearing ring 11 and the wedge ring 18 or the coupling part 14 connected thereto. In any inclined position, the ring surface 17 and the stop surface 19 abut each other fully.

At the same time the bearing ring 11 is supported in any pivot position by the support surface 34 of its internal ring 33 and also with respect to the connecting part 21 in an axial direction. As can be seen from FIG. 4, the radius r of the support surface 34 and of the corresponding surface 35 is smaller than the radius R indicated. In the position shown in FIG. 4, the radius R starts from a rotation or tilting point about which tilt would occur, being the corresponding bearing point of the bearing ring 11 on the bearing surface 15 of the coupling part 14 when the operating pressure is too small or is non-existent inside the coupling part 14, if the pipe end 10 retained or fixed in no other way, were to move downwards. The relatively slightly curved spherical segment-shaped outer periphery of the bearing ring 15 and thus the annular seal 13 could then leave the bearing surface 15 of the coupling part 14 in the lower region and be moved towards the connecting part 21 because, in this region, the spherical segment shape is not in a position to prevent such a movement particularly when taking manufacturing tolerances into account.

Since however the radius r of the support surface 34 and the corresponding surface 35 is smaller than the radius R described above, a sufficient positive connection is present in all pivot positions and this ensures that the bearing 11 is supported with respect to the connecting part 21 in all pivoting positions. Thus the sealing action is also fully retained in the region of bearing ring 11.

The radius r could in fact be selected slightly larger with respect to the radius R, whereby the part of the inner ring 33 projecting out of the bearing ring 11 would have to be correspondingly larger in dimension; however there would be a less favourable positive connection in the region of the support surface 34 and the corresponding surface 35.

Moreover, the inner ring 33 having the bearing ring 11 can be manufactured in one piece.

What is claimed is:

1. A device for connecting two pipe ends comprising a bearing ring for attachment sealingly to one pipe end and defining a spherical outer surface and an annular end surface, said annular end surface lying in a plane inclined to a plane extending at right angles to the axis of said bearing ring, a coupling part surrounding said bearing ring and defining an inner spherical surface matched to said outer spherical surface of said bearing ring for supporting said bearing ring and formed to permit said coupling part to be axially displaced relative to said bearing ring, a stop ring on said coupling part extending radially inwardly behind said bearing ring, a seal disposed to produce a sealing connection around the circumference of said bearing ring between said outer spherical surface of said bearing ring and said inner spherical surface of said coupling part, an annular inclined stop surface associated with said coupling part and complementary to and in engagement with said annular end surface of said bearing ring, a connecting part for attachment to the other pipe end, and means connecting said connecting part with said coupling part.

2. A device as defined in claim 1, wherein said annular inclined stop surface is integral with said stop ring of said coupling part.

3. A device as defined in claim 1, and comprising a wedge ring defining said annular inclined stop surface and inserted into said coupling part between said stop ring and said bearing ring.

4. A device as defined in claim 3 and comprising locking means for said wedge ring to prevent rotation between said wedge ring and said coupling part.

5. A device as defined in claim 1, wherein said annular surface of said bearing ring and said stop surface are left unworked.

6. A device as defined in claim 1, wherein said annular surface of said bearing ring and said stop surface are left roughened.

7. A device as defined in claim 1, and comprising a handle connected to at least one of said coupling part and said one pipe end.

8. A device as defined in claim 1, and comprising scale marks on said coupling member or said pipe end associated therewith and a marking from which the respective pivot angle which has been set can be read off on said pipe end or said coupling member respectively.

9. A device as defined in claim 1, and comprising a spherical segment-shaped support surface formed on the side of the said bearing ring facing said connecting part and a complementary spherical segment shaped surface on said connecting part; and wherein the spherical radius of said support surface and of said complementary surface is smaller than a radius which corresponds to the spacing between a bearing point of said outer spherical surface of said bearing ring on said inner spherical surface of said coupling part and a point on the outer end edge of said support surface lying diametrally opposite said bearing point.

10. A device as defined in claim 9, wherein said radius of said support surface and of said complementary surface is approximately equal to the inner radius of said bearing ring.

11. A device as defined in claim 9, and comprising an inner ring inserted into said bearing ring to present a part which projects beyond said bearing ring on the side of said bearing ring facing the connecting part, with said projecting part defining said support surface.

* * * * *